W. Thomas,
Globe Valve,
Nº 14,526.    Patented Mar. 25, 1856.
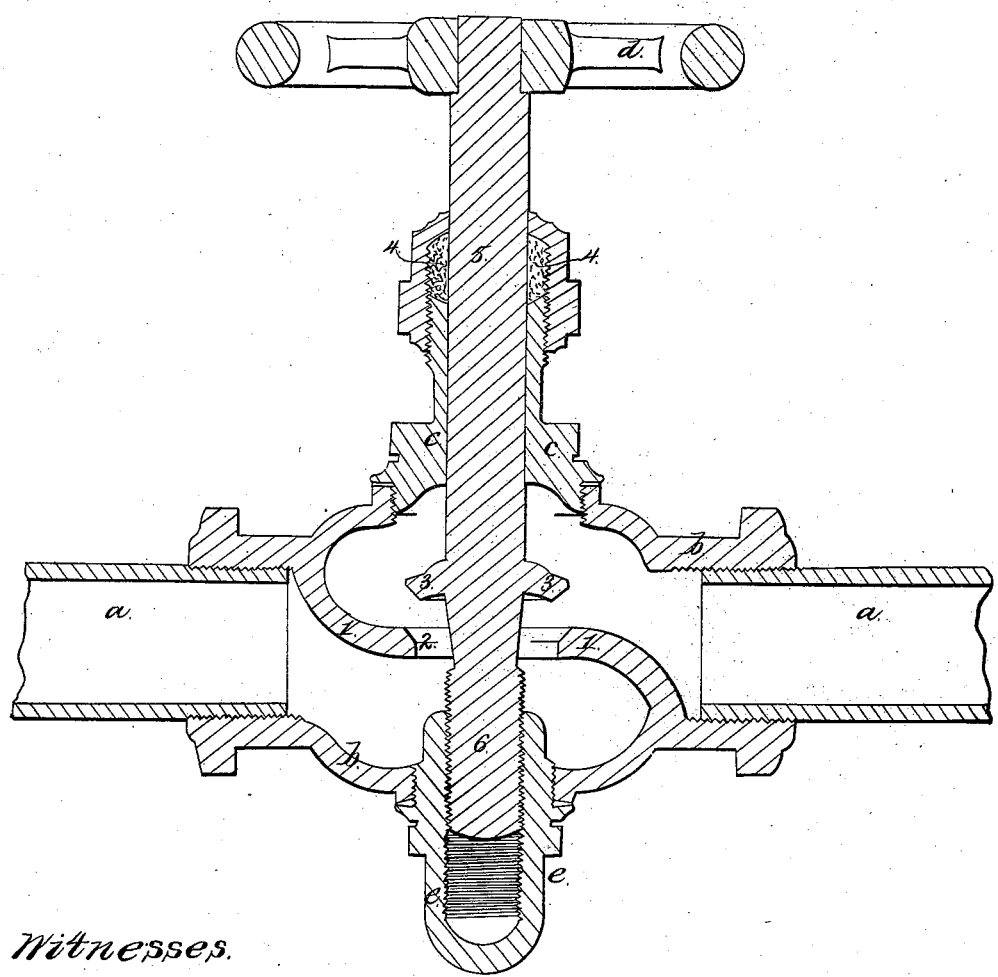
Witnesses.
Lemuel W. Serrell
Thomas G. Harold
Inventor.
William Thomas

UNITED STATES PATENT OFFICE.

WILLIAM THOMAS, OF NEW YORK, N. Y., ASSIGNOR TO ABNER VAN HORN.

COCK FOR STEAM, WATER, &c.

Specification of Letters Patent No. 14,526, dated March 25, 1856.

*To all whom it may concern:*

Be it known that I, WILLIAM THOMAS, of the city, county, and State of New York, have invented a new and Improved Mode in Operating Valves of Cocks for Steam, Water, &c.; and I do declare that the following is a full and exact description of the same, reference being had to the accompanying drawing, and to the letters and figures marked thereon, which make a part of this specification.

The nature of my improvement consists in having a screw thread cut upon the inner or lower end of the valve stem, and a corresponding screw thread cut within the hollow and fixed screw-nut, so that by turning the hand wheel it will cause the valve to be raised and lowered with a more mechanical certainty than any other valve cock to me known, also of greater simplicity and durability than any in public use.

The following is a description of the cock which is represented as being cut in half in order to show its divisions and the improved mode of operating the valve.

*a, a* represents pipes connected to each side of the shell or body (of the valve), *b*, which is of common construction and in common use.

*d*, represents the hand wheel which turns forward and backward the stem, 5, which is substantially supported by the fixed screw thimble, *c*, packing and packing box, 4, in connection with the fixed and hollow screw-nut, *e*, as represented at, 6, which has a screw thread cut within it, and a corresponding screw thread cut upon the stem, 5, at, 6, which when the hand wheel, *d*, is turned forward and backward will cause the valve, 3, to be raised and lowered from and down into the seat, 1, thereby opening and closing the ingress or egress as represented at, 2.

Having thus briefly described my improvement and its operation, I wish it to be particularly understood that I do not claim any part of the invention patented to J. Griffiths, Feb. 14th, 1854, it being no part of my improvement. Neither do I claim the fixed screw thimble, *c*, or the fixed screw-nut, *e*, of itself, which are in common use for the support of the faucet stem and are made by others, as well as ourselves. I, therefore wish to be understood as not claiming the combination set forth and used by J. Griffiths. But What I do claim as my improvement and desire to secure by Letters-Patent, is—

The position in which the method is employed or used to raise and lower the valve, viz, in having the screw thread cut upon the opposite end from the hand wheel, and inner end of the valve stem, 5, at, 6, and a corresponding screw thread cut within the fixed screw nut, *e*, which is of sufficient depth as to allow the screw upon the stem to work sufficiently far as to raise and lower the valve without disconnecting itself; whereby the whole arrangement can be better and more easily and substantially constructed, kept in order and operated as set forth and fully described.

WM. THOMAS.

Witnesses:
WM. H. RIBLET,
DANIEL KEYES.